March 31, 1970  F. T. GOSTOMSKI  3,503,647
CAMPER HOLDDOWN BRACKET

Filed May 16, 1968  2 Sheets-Sheet 1

INVENTOR
FRANK T. GOSTOMSKI
BY
Henderson & Strom
ATTORNEYS

March 31, 1970   F. T. GOSTOMSKI   3,503,647
CAMPER HOLDDOWN BRACKET

Filed May 16, 1968   2 Sheets-Sheet 2

INVENTOR
FRANK T. GOSTOMSKI
BY
*Henderson & Strom*
ATTORNEYS

United States Patent Office 3,503,647
Patented Mar. 31, 1970

3,503,647
CAMPER HOLDDOWN BRACKET
Frank T. Gostomski, Wahoo, Nebr. 68066
Filed May 16, 1968, Ser. No. 729,733
Int. Cl. B62d 27/06; B60p 3/32
U.S. Cl. 296—23
8 Claims

ABSTRACT OF THE DISCLOSURE

A universal camper holddown bracket for securing a camper to the bed of a pickup truck having lipped sidewalls, the bracket comprising a plate mounted on the underside of the camper disposed over the sidewalls, an arm pivotally connected to the plate and engageable with the lip of the sidewall of the truck, a rod slidably disposed on the plate and pivotally connected on one end to the arm, wherein the arm is pivotable, in response to movement of the rod, from a non-locking engagement to a locking engagement with the lip, and a locking device disposed on the rod for locking the arm in a locking engagement position.

BACKGROUND OF THE INVENTION

This invention pertains generally to land vehicles, bodies and tops, and more particularly to holddown brackets for securing a camper body to the bed of a pickup truck.

In recent years, pickup campers have become popular and appear on the market in a variety of different shapes, models and designs. These units are lifted onto the truck bed and anchored to the truck by tie rods, wires or other securing means attached either to the truck bed or to the body of the truck. Anchoring the campers has been a difficult problem, in that tie rods or wires extend from the camper over the sides of the truck bed and hence are conspicuous and unsightly, or brackets or fixtures are attached to the bed in locations difficult to reach in mounting the camper on and removing it from the truck. Further, some of the fixtures of the more inconspicuous types do not anchor the camper securely, and hence are unsafe while the truck is being driven with the camper, or while the camper is being used on the truck bed.

Pickup truck beds include a bottom wall, sidewalls, end wall and a tailgate with the wheel wells projecting into the bed. The sidewalls have stake wells provided therein for receiving stakes of a rack or the like. The tops of the sidewalls bend inwardly toward each other, thus forming opposing lips which are disposed over the bottom wall of the truck. The design of the sidewalls and the lips for each manufacturer and the location of the stake wells, however, are different, thus necessitating a plurality of different brackets to supply the market.

To be effective, a holddown bracket must prevent the camper from bouncing off the truck bed while traversing rough terrain, sliding off the bed when traveling up a hill, or from sliding or slamming into the end wall and cab of the truck when traveling downhill or in the event of a sudden stop. Furthermore, as most owners of campers utilize the truck for many purposes, the bracket must be simple to operate, easily accessible for securing the camper to or releasing it from the pickup truck, and if mounted on the truck, readily removable so as not to interfere with the use of the bed when the camper is removed therefrom. The bracket must also be readily connectible to substantially any make and model of a camper without the use of special tools or skills, and effectively secure the camper to substantially any make and model of a pickup truck without requiring any changes in its construction and design.

SUMMARY

In brief, this invention relates to a bracket which is mounted on a camper for securing same to the bed of a pickup truck. No part of the bracket is affixed to the truck, nor are wires, cables or unsightly fixtures attached to or conspicuously disposed over or on either the camper or the truck. The bracket, mounted on the underside of the overhang of the camper and disposed over the bed and sidewall of the truck, includes a plate secured to the camper, a hook bar pivotally mounted on one end of the plate and integrally connected to a lever, a rod pivotally mounted on one end to the lever and projecting outwardly toward the side of the camper, a handle threadably mounted on the other end of the rod, a flange formed on the handle and coactable with the other end of the plate for locking the handle in a predetermined position. The hook arm is coactable with the lip of the sidewall and a stake well of the truck for securing the camper to the bed and for preventing horizontal movement of the camper relative to the bed.

An object of this invention is the provision of a camper bracket which is mountable on the camper for securing same to a pickup truck and which does not require the drilling of any holes in the truck, the disfiguration of the truck bed, or the attachment of any part of the bracket to the truck.

Another object of this invention is to provide a camper bracket which is simple to operate, easily accessible for securing the camper to or releasing it from the bed of the truck, and which does not interfere with the use of the bed when the camper is removed therefrom.

A further object of this invention is the provision of a camper bracket which can be mounted on substantially any make and model of a camper and which effectively secures the camper to substantially any make and model of a pickup truck.

Yet another object of this invention is the provision of a camper bracket which is economical to manufacture, extremely compact, functional in use and appearance, and simple but rugged in construction.

These objects, and other features and advantages of this invention will become more readily apparent upon reference to the following description, when taken in conjunction with the accompanying drawings.

BRIEF DESCRIPTION OF THE DRAWINGS

In the drawings, although various modifications and alternate constructions can be made thereto without departing from the true spirit and scope of the invention, a preferred embodiment of this invention is illustrated, wherein.

DESCRIPTION OF PREFERRED EMBODIMENT

Figure 1:
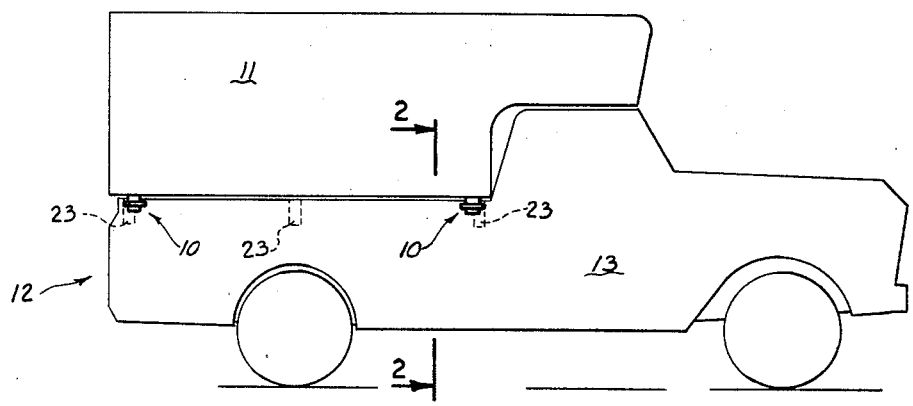
FIG. 1 is a side elevational view of a camper secured to the bed of a pickup truck by the hold-down brackets of this invention.

Referring now to the drawings, the camper holddown bracket of this invention is indicated generally at 10 in FIG. 1, and is used for securing a camper 11 to the bed 12 of a pickup truck 13. This invention provides a universal bracket in that it can be mounted on substantially any make and model of camper for securing same to substantially any make and model of pickup truck.

The camper 11 having a boxlike frame, has a relatively narrow bottom section 14 (FIG. 2) or well, which mounts on the floor 16 of the bed of the pickup truck between the wheel wells (not shown) and upstanding sidewalls 18, and a main or wider section 19 which extends laterally over the sidewalls 18. The two sections 14 and 19 are connected by an overhang wall 21. To provide rigidity to the camper frame, an elongated frame member 22 is secured to the overhang 21 at its outer edge, the member extending longitudinally the full length of the overhang.

Each sidewall 18 of the truck terminates in an inwardly extending lip 22 which projects toward its counterpart on the opposite sidewall. Formed in the lips of each sidewall are a plurality of spaced, vertically disposed stake wells 23 (FIGS. 1 and 2), adapted to receive the posts of a rack or the like, wherein a stake well 23 is provided at both corners of each sidewall.

Figure 4:
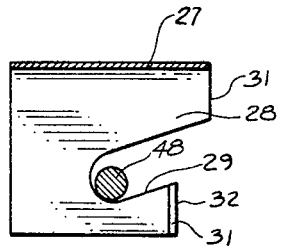
FIG. 4 is a sectional view taken along the line 4—4 in FIG. 3.

The bracket 10 (FIG. 2) includes a horizontally disposed plate 24 mounted to extend transversely on the overhang 21 by a plurality of bolts 26, or the like. Because some campers have the member 22, the forward portion 27 of the plate 24 is bent at an angle to facilitate the mounting of the plate 24 on the overhang 21. Depending from and integral with the free end of the forward portion 27 is a slotted element 28, wherein the slot 29, as viewed in FIG. 4, angles upwardly from the center to an outer edge 31 of the element. A leg 32 of the element 31, disposed below the slot 29, is bent to project outwardly from the main body for a purpose hereinafter described.

Figure 5:
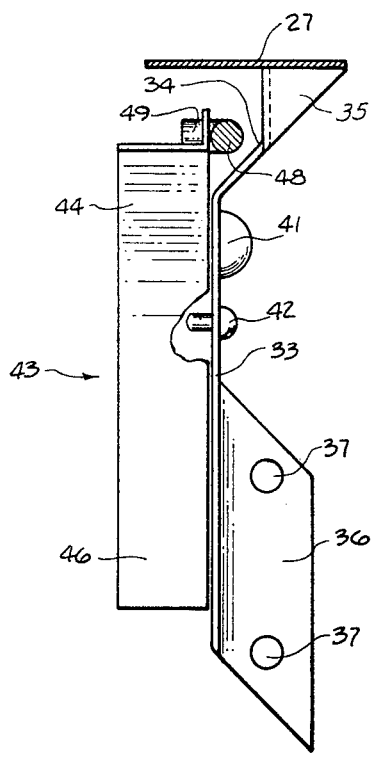
FIG. 5 is a sectional view taken along the line 5—5 in FIG. 3.

Depending from and welded to the rear end of the plate 24 (FIG. 2), and angled at substantially 45° thereto, is a post 33 having an offset 34 (FIG. 5) formed at the upper end thereof. It will also be observed in FIGS. 3 and 5 that the upper forward corner 35 of the post 33 is bent at an angle to enhance the holding characteristics of the weld between the post 33 and the plate 24. The lower end of the post 33 has a flange 36 formed at right angles thereto which has a pair of spaced holes 37 drilled therethrough. Securing the flange 36 to the sidewall 39 of the bottom section 14 (FIG. 2) are a pair of bolts 38, or the like. A pin 41 is secured to the post 33 below the offset, and spaced below the pin 41 and secured to the post is a stop 42.

Figure 2:
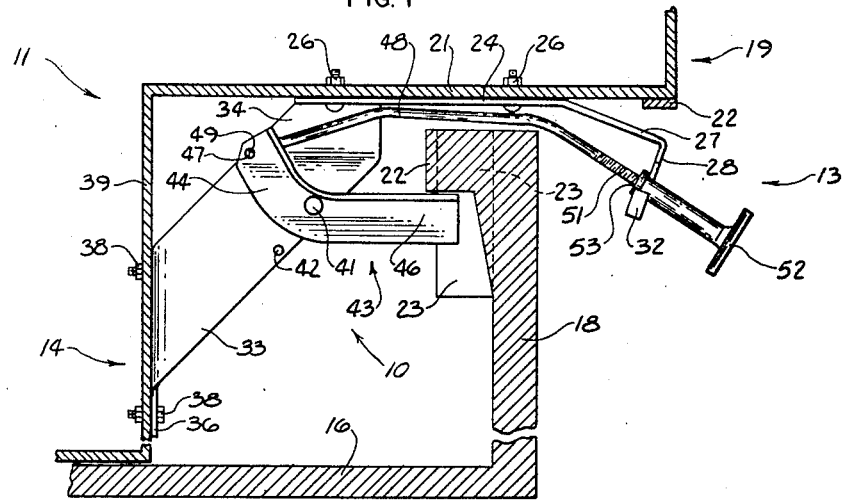
FIG. 2 is a fragmentary sectional view taken along the line 2—2 in FIG. 1, with the bracket in locking engagement with the sidewall of a pickup truck.

Pivotally mounted at a pivot point on the pin 41 (FIG. 2) is an arm unit 43, formed from an angle iron, having a lever arm 44 integral with a hook arm 46. The lever arm 44, as viewed in FIG. 2, represents the short leg of the substantially L-shaped unit 43, while the hook arm 46 represents the long arm thereof. An aperture 47 is formed in the free end of the lever arm 44. The upper edge of the hook arm 46 adapted to contact the lip 22 is flat surfaced and has no protuberances or projections extending outwardly therefrom, thus providing a contact surface between the hook arm and lip regardless of the height of the lip above the floor 16 of the truck bed. The unit 43 is pivotable from a first position (FIG. 3) wherein the hook arm 46 is in non-engagement with the lip 22, and the lower edge thereof abuts the stop 42, to a second position (FIG. 2) wherein the upper edge is in engagement with the undersurface of the lip 22. Although in FIG. 2 the upper edge is horizontal, it is possible because of the height of the lip that the upper edge could be inclined either upwardly or downwardly.

A curved rod 48 (FIG. 2), having one end 49 bent at a right angle thereto, is pivotally disposed at the one end 49 thereof in the aperture 47 with the other end 51 of the rod projecting toward and through the slot 29. The other end 51 is threaded for threadably receiving a T-shaped handle 52. The shank of the handle 52 has an annular ring 53 secured to the free end thereof, the outer diameter of which exceeds the lateral dimension of the slot 29.

The end 49 of the rod (FIG. 5) is mounted in the aperture 47 before the stop 42 is secured to the post, with the rear portion of the rod 48 adjacent the end 49 disposed between the lever arm 44 and the offset 34. The stop 42 is provided to prevent the unit 43 from pivoting to a position wherein the end 49 could slide out of the aperture 47. The distance provided between the offset 34 and the lever arm 44 is less than the length of the end 49, thus effectively containing the end 49 in the aperture. The diameter of the aperture 47 is slightly greater than the diameter of the rod, thus allowing the threaded end 51 to be manually moved through a small horizontal arc at least as great as the greatest length of the slot 29.

When the hook arm 46 is in engagement with the lip 22 (FIG. 2), the shank end of the handle is disposed in the slot with the annular ring disposed against the rear face of the element 28. To pivot the hook arm to a non-engagement position (FIG. 3), the handle 52 is moved upwardly and to the side, thus freeing the annular ring 53 from the slot. The leg 32 is provided to enlarge the opening into the slot thus facilitating the insertion of the shank end of the handle thereinto.

To mount the bracket 10 on the camper 11, the position of the stake wells 23 relative to the camper, assuming it was disposed on the bed of the pickup truck, is determined. The brackets 10 are then secured by the bolts 26 and 38 to the camper so that the forward brackets are positioned to lie behind the forward stake wells and the rear brackets are positioned to lie forward of the rear stake wells.

Figure 3:
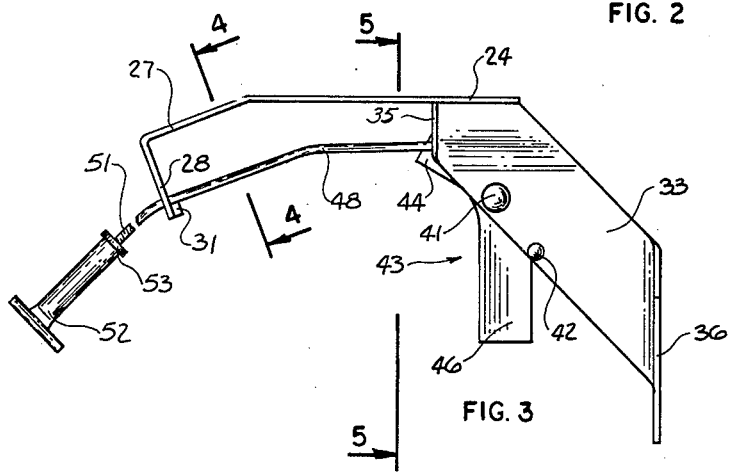
FIG. 3 is a side elevational view of the bracket showing the rear side thereof, with the bracket in a non-locking engagement.

The camper 11 is placed on the floor 16 of the truck bed by conventional means with the hook arms 46 in the first position (FIG. 3). To pivot the hook arm 46 into the second position (FIG. 2) the handle is grasped and pushed toward the element 28 thus causing contact between the lip 16 and the upper surface of the hook arm. The shank end of the handle is then slid into the slot 29 with the annular ring disposed adjacent the rear face of the element 28, thus effectively locking the hook arm in the second position. By rotating the handle 52 counter to the direction of the threads on the rod 48, the annular ring can be brought into tight engagement with the element to prevent the shank end of the handle from sliding or bouncing out of the slot 29 thus disengaging the hook arm from the lip. Rotation of the handle also increases or decreases the effective length of the rod between the element and lever arm, thus regardless of height of the lip, the hook arm can be pivoted into contact therewith.

The prepositioning of the brackets 10 relative to the stake wells allows the side of the hook arm disposed adjacent to the stake wells to contact same, thus preventing horizontal movement of the camper in the pickup truck bed.

Although a preferred embodiment of this invention has been described and disclosed hereinbefore, it is to be remembered that various modifications and alternate constructions can be made thereto without departing from the true spirit and scope of the invention as defined in the appended claims.

I claim:
1. A camper holddown bracket for securing a camper to the bed of a pickup truck having lipped sidewalls and a plurality of stake wells, the bracket comprising:
    means mounted on the under side of the camper disposed over the sidewall;
    an arm means pivotally mounted on said means; and
    a rod slidably disposed on said means and pivotally disposed on one end thereof to said arm means;
    said arm means pivotable, in response to movement of said rod, from non-locking engagement to locking engagement with the lip of the sidewall of the truck.
2. A camper holddown bracket as defined in claim 1 including a locking means disposed on the other end of said rod and coactable with said means for securing said rod in a locked position when said arm means is in said locking engagement.

3. A camper holddown bracket as defined in claim 2 wherein said means includes a plate mounted on the under side of the camper disposed over the sidewall, a depending post secured to one end of said plate with said arm means pivotally connected to said post at a predetermined distance from said plate, and a depending element secured to the other end of said plate, said rod other end coactable with said element.

4. A camper holddown bracket as defined in claim 3 wherein said arm means includes a lever arm integrally connected on one end thereof to one end of a hook arm, said lever arm and hook arm pivotally connected at the junction thereof to said post, said hook arm upper edge having a flat surface adapted to coact with the lip and said hook arm side edge adapted to coact with one of the stake wells.

5. A camper holddown bracket as defined in claim 4 and including a stop secured to said post and spaced from said pivot point for limiting the arc through which said hook arm can pivot thus preventing said rod one end from disengaging from said lever arm.

6. A camper holddown bracket as defined in claim 5 wherein said element has a slot formed therein for receiving said rod other end.

7. A camper holddown bracket as defined in claim 6 wherein the other end of said rod is threaded, and including a handle having its shank end threadably mounted on said rod other end, with the outer diameter of said shank end being less than the width of said slot, and said locking means including an annular ring disposed on said shank end wherein said outer dimension of said ring is greater than said slot width.

8. A camper holddown bracket as defined in claim 7 wherein the free end of said post is adapted to be secured to the camper.

References Cited

UNITED STATES PATENTS

| | | | |
|---|---|---|---|
| 3,431,017 | 3/1969 | Joseph | 296—35 |
| 2,559,029 | 7/1951 | Randolph | 296—23 X |

PHILIP GOODMAN, Primary Examiner

U.S. Cl. X.R.

296—35